(12) United States Patent
Kitamura et al.

(10) Patent No.: US 7,066,634 B2
(45) Date of Patent: Jun. 27, 2006

(54) SPREAD ILLUMINATING APPARATUS HAVING LIGHT CONTROLLING MEANS

(75) Inventors: Atsushi Kitamura, Iwata-gun (JP); Motoji Egawa, Iwata-gun (JP)

(73) Assignee: Minebea Co., Ltd., Nalano-Ken (JP)

( * ) Notice: Subject to any disclaimer, the term of this patent is extended or adjusted under 35 U.S.C. 154(b) by 143 days.

(21) Appl. No.: 10/788,292

(22) Filed: Mar. 1, 2004

(65) Prior Publication Data

US 2004/0190307 A1    Sep. 30, 2004

(30) Foreign Application Priority Data

Mar. 27, 2003    (JP)    ............................. 2003-088204

(51) Int. Cl.
*F21V 7/04* (2006.01)

(52) U.S. Cl. ...................... 362/616; 362/600; 362/610; 362/622; 362/621

(58) Field of Classification Search ................ 362/600, 362/610, 608, 616, 622, 621; 385/901, 131
See application file for complete search history.

(56) References Cited

U.S. PATENT DOCUMENTS 5,838,869 A * 11/1998 Rasch et al. ................ 385/132
6,540,368 B1 * 4/2003 Akaoka ....................... 362/610
2004/0165371 A1 * 8/2004 Kitamura et al. ............. 362/31
2004/0190279 A1 * 9/2004 Kitamura ..................... 362/26

FOREIGN PATENT DOCUMENTS

| JP | A 10-199316 | 7/1998 |
| JP | A 10-293202 | 11/1998 |
| JP | A 2002-260427 | 9/2002 |

* cited by examiner

*Primary Examiner*—Sandra O'Shea
*Assistant Examiner*—Anabel Ton
(74) *Attorney, Agent, or Firm*—Oliff & Berridge, PLC

(57) ABSTRACT

A spread illuminating apparatus comprises a plurality of LED's as light sources, a light conductive plate, and a light controlling means disposed between the LED's and the light conductive plate. The light controlling means includes a plurality of transparent resin films which have respective different refractive indexes, which are laminated over one another in a direction parallel to a major surface as a light exit surface of the light conductive plate thereby forming a refractive index profile in the direction parallel to the light exit surface of the light conductive plate, and two adjacent ones of which are put together by adhesive that can transmit light emitted from the LED.

11 Claims, 8 Drawing Sheets

$\sqrt{A}=A1$ $\sqrt{A}=A2$ $\sqrt{A}=A3$ $\sqrt{A}=A4$

SPREAD ILLUMINATING APPARATUS HAVING LIGHT CONTROLLING MEANS

BACKGROUND OF THE INVENTION

1. Field of the Invention

The present invention relates to a spread illuminating apparatus for use with a liquid crystal display (LCD) device, and particularly to a spread illuminating apparatus employing one or more spot-like lamp as a light source.

2. Description of the Related Art

A spread illuminating apparatus of side light type, which has a light source disposed so as to face one end surface of a light conductive plate, is heavily used as a subsidiary illuminating apparatus for an LCD device. In a side light type spread illuminating apparatus, its light source is shaped bar-like, for example a fluorescent lamp, and has a length substantially equal to the width of a light conductive plate, whereby the light conductive plate can be illuminated entirely in a uniform manner.

In a device, such as a portable telephone, which demands low power consumption, a light emitting diode (LED) is employed as a light source. The LED is a spot-like lamp and raises a problem with regard to achieving a uniform brightness spread across the light conductive plate.

A spread illuminating apparatus of side light type introduced to address the problem is disclosed, for example, in Japanese Patent Application Laid-Open No. H10-293202. In the spread illuminating apparatus disclosed therein, an end surface (light entrance surface) of a light conductive plate facing an LED is provided with a prism array structure which is adapted to laterally diffuse light emitted from the LED, and a light scattering pattern for a uniform spreading is formed on a major surface of the light conductive plate. And, a light diffuser plate may be optionally disposed between the light conductive plate and an LCD as required for achieving a further uniform illumination.

Another side light type spread illuminating apparatus to address the same problem is disclosed, for example, in Japanese Patent Application Laid-Open No. 2002-260427. In the spread illuminating apparatus, an optical element comprising an array of prisms is disposed between an LED and a light conductive plate so that light emitted from the LED is refracted differently depending on its incidence angle with respect to the prisms thereby changing the traveling direction and intensity distribution of the light when entering the light conductive plate.

Still another side light type spread illuminating apparatus is disclosed in Japanese Patent Application Laid-Open No. H10-199316 and is shown in FIG. 10 attached herein. In the spread illuminating apparatus shown in FIG. 10, an LED 1 as a spot-like light source is disposed at an end surface 2C of a light conductive plate 2, and light emitted from the LED 1 enters the light conductive plate 2 and exits from one of two major surfaces of the light conductive plate 2. A plurality of grooves 2D extending orthogonally to the major surfaces are formed at a central portion of the end surface 2C of the light conductive plate 2 so as to oppose the LED 1, whereby light emitted from the LED 1 is diffused upon entering the light conductive plate 2.

The above-described spread illuminating apparatuses using an LED, as a light source, have the following problems.

Firstly, an optical path conversing means, which comprises, for example, arrayed prisms, or grooves as described above, must be formed at or disposed before an entrance surface of a light conductive plate so as to laterally spread light emitted from the LED. Such prisms or grooves must be arrayed at very minute interval, which requires microfabrication resulting in an increased cost.

Secondly, the traveling path of light emitted from the LED and once spread laterally cannot be controlled as desired, for example, cannot be collimated.

Thirdly, referring to FIG. 9 which shows a conventional spread illuminating apparatus, a light conductive plate 2 is forced to have a major surface larger than a display screen area of an LCD device (not shown) disposed over the light conductive plate 2. Specifically, what is called "a dead area 2A", where lights emitted from LED's 1 are not uniformly spread, exists at a light entrance area of the light conductive plate 2, and has a length Ld usually ranging from 2 to 4 mm in case of a small equipment, such as a portable telephone. The dead area 2A is covered up so as to prevent light introduced in the light conductive plate 2 from exiting therefrom, thus the dead area 2A is just wasted and only an area 2B is utilized for illuminating the display screen of the LCD device (not shown), which hinders downsizing.

Lastly, referring again to FIG. 10, since an air layer exists between the LED 1 and the plurality of grooves 2D as an optical path conversing means, light emitted from the LED 1 is not fully utilized failing to provide sufficiently bright illumination. In order to compensate for resulting shortfall of brightness, power consumption must be increased thus constituting an obstacle in lowering power consumption which is strongly required.

SUMMARY OF THE INVENTION

The present invention has been made in light of the problems described above, and it is an object of the present invention to provide a spread illuminating apparatus which typically uses at least one spot-like lamp (but not necessarily limited thereto) as a light source and which gives a bright and uniform illumination.

In order to achieve the object, according to one aspect of the present invention, in a spread illuminating apparatus which comprises at least one light source (typically a spot-like lamp), and a light conductive plate which has the at least one light source disposed toward one end surface thereof so as to introduce light emitted from the light source thereinto, and which allows the light introduced thereinto to exit out from a light exit surface thereof toward an object to be illuminated, a light controlling means is provided between the at least one light source and the light conductive plate. The light controlling means has a refractive index profile formed in a direction parallel to the light exit surface of the light conductive plate.

In the one aspect of the present invention, the light controlling means may be structured such that a refractive index variation appears repeatedly in the direction parallel to the light exit surface of the light conductive plate.

In the one aspect of the present invention, a light entrance surface and a light exit surface of the light controlling means may be plane.

In the one aspect of the present invention, the light entrance surface and the light exit surface of the light controlling means may be connected respectively to a light emitting surface of the light source and one end surface of the light conductive plate by means of adhesive which can transmit light emitted from the light source.

In the one aspect of the present invention, the light controlling means may comprise a plurality of transparent films laminated over one another, and two adjacent ones thereof may be put together by adhesive which can transmit light emitted from the light source.

In the one aspect of the present invention, the transparent films may be formed of glass.

In the one aspect of the present invention, the transparent films may be formed of resin.

In the one aspect of the present invention, the refractive index profile may be formed symmetric about a plane corresponding to a center of the light source.

In the one aspect of the present invention, the refractive index profile may be formed asymmetric about a plane corresponding to a center of the light source.

In the one aspect of the present invention, the light source may be located to a portion of the light controlling means having a highest refractive index.

In the one aspect of the present invention, the light source may be located to a portion of the light controlling means having a lowest refractive index.

Since the light entrance and exit surfaces of the light controlling means can be left plane as they are cut not requiring any additional work applied thereon, the production cost can be reduced, and also the connection to the light source and to the light conductive plate can be made easily and surely. Since the light controlling means is disposed so as to occupy part of a dead area which is inherently found conventionally in a light conductive plate and which is just wasted, downsizing can be achieved. Further, since the light entrance and exit surfaces of the light controlling means are connected tightly to the light emitting surface of the light source and to the light entrance surface of the light conductive plate, respectively, by means of optical adhesive, there exists no air layer therebetween, and therefore light emitted from the light source does not suffer unwanted reflection caused due to an air layer thus preventing waste of light emitted from the light source, which results in reduction in power consumption.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENTS

Figure 1:
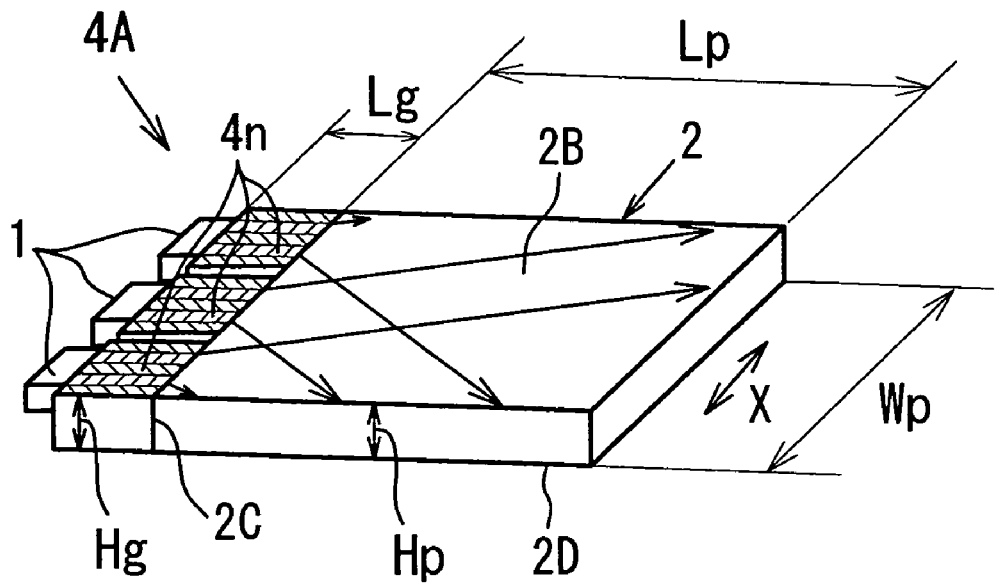
FIG. 1 is a schematic perspective view of a spread illuminating apparatus according to a first embodiment of the present invention.
Figure 9:
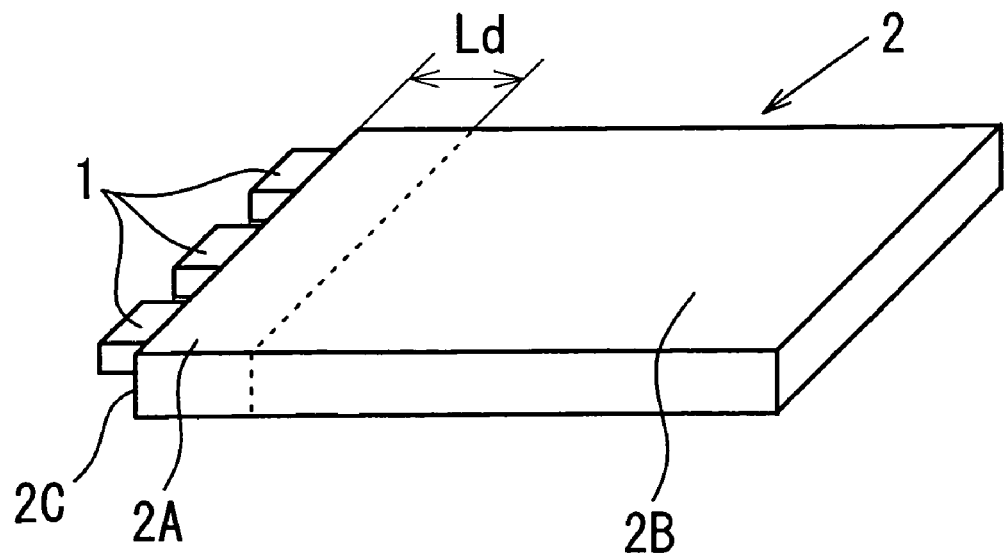
FIG. 9 is a perspective view of a conventional spread illuminating apparatus comprising stop-like lamps as light sources.
Figure 10:
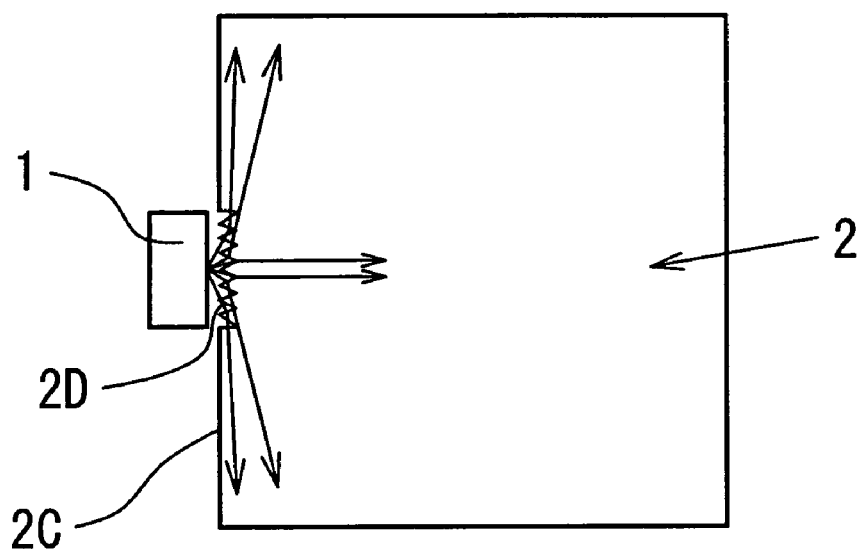
FIG. 10 is a top plan view of another conventional spread illuminating apparatus which comprises an LED as a light source, and which is provided with a light controlling means adapted to address lateral direction.

A first embodiment of the present invention will be described with reference to FIGS. 1, 3A, and 3B, and other drawings as appropriate. In the first embodiment, in order to address the issues of downsizing, and uniform and bright illumination, a spread illuminating apparatus comprises, as shown in FIG. 1, a plurality of light emitting diodes (LED's) 1 as spot-like light sources, a light conductive plate 2, and a light controlling means 4A which consists of a plurality (three in the figure) of light controlling means segments (hereinafter referred to simply as "segment" as appropriate) 4n separated from one another, and which is disposed between the LED's 1 and the light conductive plate 2. In other words, the light controlling means 4A is positioned so as to occupy the dead area 2A discussed above with reference FIG. 9 in the prior art description. Each of the segments 4n has a refractive index profile formed in a direction X horizontal with respect to a major surface (light exit surface) 2B of the light conductive plate 2.

The segments 4n are provided in a number corresponding to the number of the LED's 1, structured identical with one another (in the embodiment), and arrayed in a direction along the light exit surface 2B. The light conductive plate 2 in FIG. 1 is shown as having a constant thickness with respect to light traveling direction but may alternatively have a wedge-shaped cross section. Also, the light conductive plate 2 may have a light scattering and diffusing means formed on the light exit surface 2B and on another major surface 2D thereof opposite to the light exit surface 2B. The light scattering and diffusing means are provided in a spread illuminating apparatus disclosed in Japanese Patent Application Laid-Open No. H09-63332, and detailed explanation thereof is omitted.

The segment 4n has a height Hg substantially equal to a height Hp of a side surface of the light conductive plate 2 (that is the thickness of the light conductive plate 2), and has the above-described refractive index profile. The segments 4n is structured such that a plurality of transparent resin films are laminated over one another with optical adhesive (hereinafter referred to as "adhesive layer") to be detailed later being sandwiched between two adjacent films. Light entrance and exit surfaces of the segment 4n are connected respectively to a light emitting surface of the LED 1 and to a light entrance surface 2C of the light conductive plate 2 by applying adhesive 5 (refer to FIG. 3B) thereby eliminating air layer therebetween so as to inhibit unwanted Fresnel reflection. The adhesive 5, the transparent resin films, and the adhesive layer applied between the resin films are formed of material to be mentioned later, which can transmit light emitted from the LED 1.

Figure 3A:
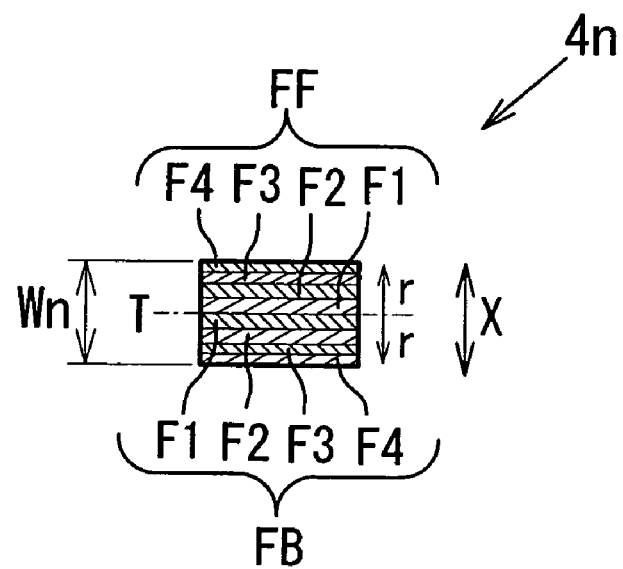
FIG. 3A is a schematic top plan view of a light controlling means segment of a light controlling means employed in the spread illuminating apparatus of FIG. 1.
Figure 3B:
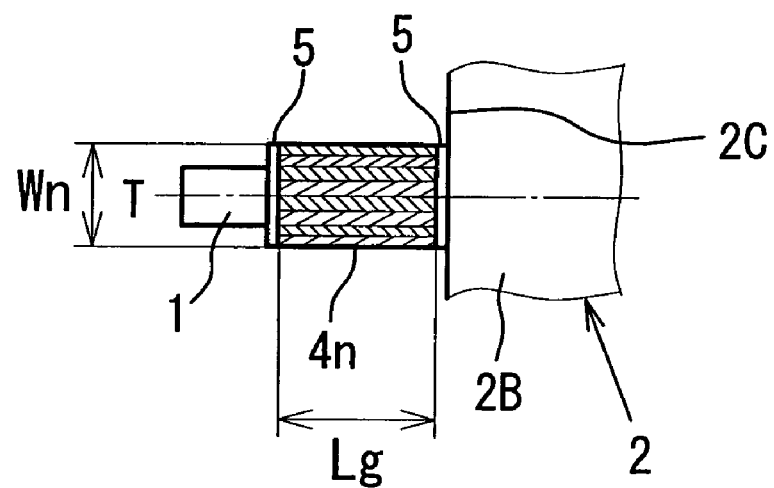
FIG. 3B is a top plan view of the light controlling means segment of FIG. 3A duly arranged in the spread illuminating apparatus of FIG. 1.

Referring to FIG. 3A, the segment 4n consists of two divisions FF and FB, which each comprise a plural (four in the figure) kinds of transparent resin films F1 to F4 having respective refractive indexes differing from one another so as to sequentially increase and laminated over one another in this order, and which are structured symmetrically about a center plane T such that the respective refractive indexes n increase from the innermost portions adjacent to the center plane T toward the both outermost portions. In this connection a plural kinds of transparent adhesive layers U1 to U3 (not shown in FIG. 3A, and to be detailed later) having respective different refractive indexes are sandwiched respectively between two adjacent resin films for fixing them together, and an adhesive layer U4 may be optionally placed on the outermost resin film F4 as required for still further diffusion, and/or for protection.

Referring back to FIG. 1, the plurality of segments 4n are arrayed parallel to the light entrance surface 2C of the light conductive plate 2, and are spaced equidistantly from one another so that lights, which are emitted from the LED's 1, go through respective segments 4n of the light controlling means 4A, enter the light conductive plate 2, and which exit out from the light exit surface 2B, are adapted to illuminate a display screen of an LCD device (not shown) in a uniform manner.

Figure 8A:
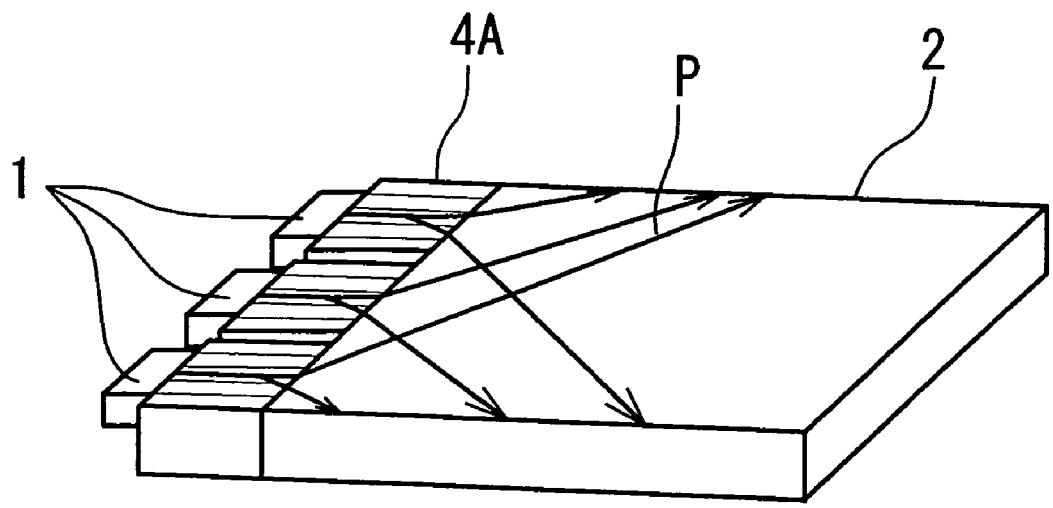
FIG. 8A is a light tracking view of the light controlling means employed in the first embodiment of the present invention.

Each of the LED's 1 is positioned such that the emitting center thereof with respect to the direction X is aligned to the center of the segment 4n, namely the center plane T which is constituted by a core adhesive layer U0 (not shown in FIG. 3A; to be described later with reference to FIG. 5A) connecting the two innermost resin films F1 having the lowest refractive index. In this connection, when the segment 4n comprises transparent resin films provided in an odd number in total where the center plane T is constituted by a core resin film having the lowest refractive index, the emitting center of the LED 1 is aligned to the core resin film. In the light controlling means 4A employed in the first embodiment, the refractive index of the segments 4n increases with an increase in distance from the LED 1, whereby light emitted from the LED 1 has its traveling direction increasingly diffusing while traveling through each of the segments 4n of the light controlling means 4A so that light from the LED 1 as a spot-like light source is spread in a uniform manner across the light conductive plate 2 as shown in FIG. 8A.

A second embodiment of the present invention will now be described with reference to FIG. 2, and other drawings as appropriate. A spread illuminating apparatus according to the second embodiment shown by FIG. 2 comprises a plurality of LED's 1 as spot-like light sources, a light conductive plate 2, and a light controlling means 4B. The light controlling means 4B in the second embodiment is formed as one single piece instead of consisting of the plurality (three) of light controlling means segments 4n separated from one another as discussed in the first embodiment. In other words, the single piece light controlling means 4B is structured such that the plurality of light controlling means segments 4n discussed in the first embodiment are continuously connected with one another as detailed with reference to FIGS. 5A to 5C (via one adhesive layer U4 in the embodiment), and that a same refractive index profile formed in a direction X is continuously repeated in the direction X so that the both ends of light controlling means 4B are provided with the highest refractive index. The light controlling means 4B thus structured is disposed so as to occupy the dead area 2A discussed above with reference to FIG. 9 in the prior art description.

The number of the segments 4n corresponds to the number of the LED's 1, and the segments 4n are uninterruptedly arrayed in a direction along a light exit surface 2B of the light conductive plate 2. Each of the LED's 1 is positioned such that the emitting center thereof with respect to the direction X is aligned to a portion of each of the repeated refractive index profiles having the lowest index.

Figure 2:
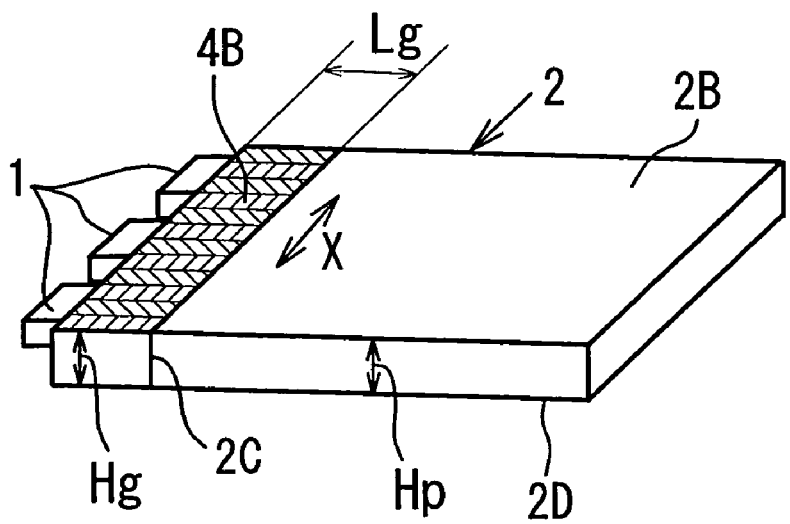
FIG. 2 is a schematic perspective view of a spread illuminating apparatus according to a second embodiment of the present invention.

The light conductive plate 2 in FIG. 2 is shown as having a constant thickness with respect to light traveling direction but may alternatively have a wedge-shaped cross section. The light controlling means 4B has a height Hg substantially equal to a height Hp of a side surface of the light conductive plate 2 (that is the thickness of the light conductive plate 2), and have the above-described repeated refractive index profiles. Light entrance and exit surfaces of the light controlling means 4B are connected respectively to respective light emitting surfaces of the LED's 1 and to a light entrance surface 2C of the light conductive plate 2 by applying optical adhesive.

For ease of understanding the second embodiment of the present invention, the manufacturing method of the light controlling means 4B will be described with reference to FIGS. 5A to 5C, and 6.

Figure 5B:
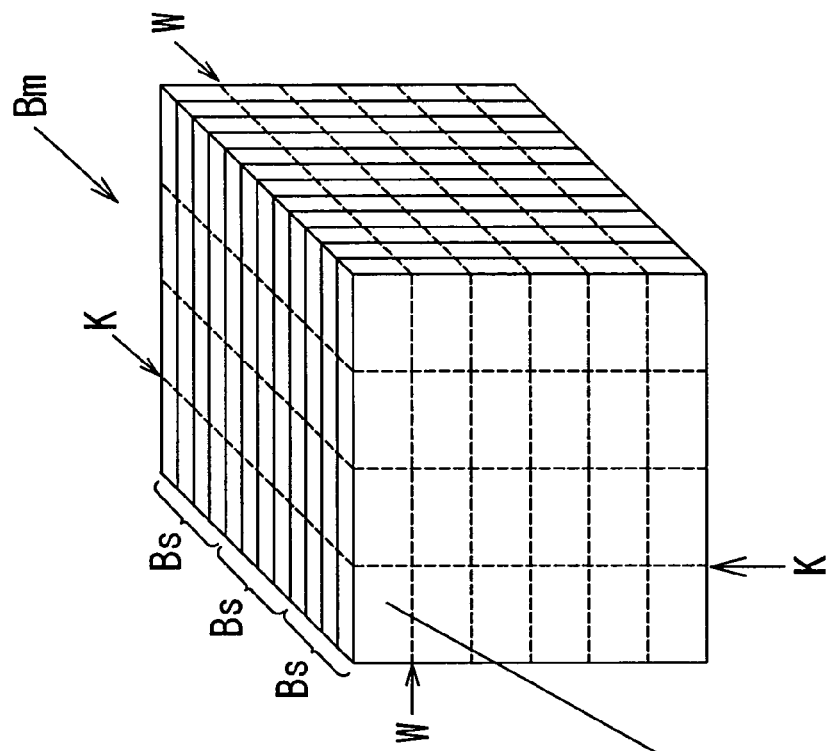
FIG. 5B is an explanatory schematic perspective view of a work-in-process of the light controlling means at a later process.
Figure 5C:
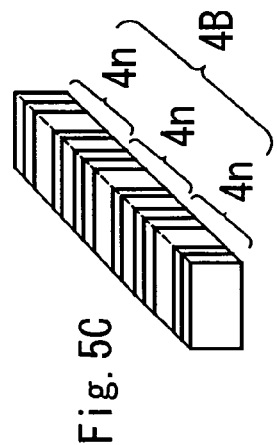
FIG. 5C is a schematic perspective view of a piece cut from the work-in-process of FIG. 5B, that is a completed product of a light controlling means in the second embodiment of the present invention.
Figure 5A:
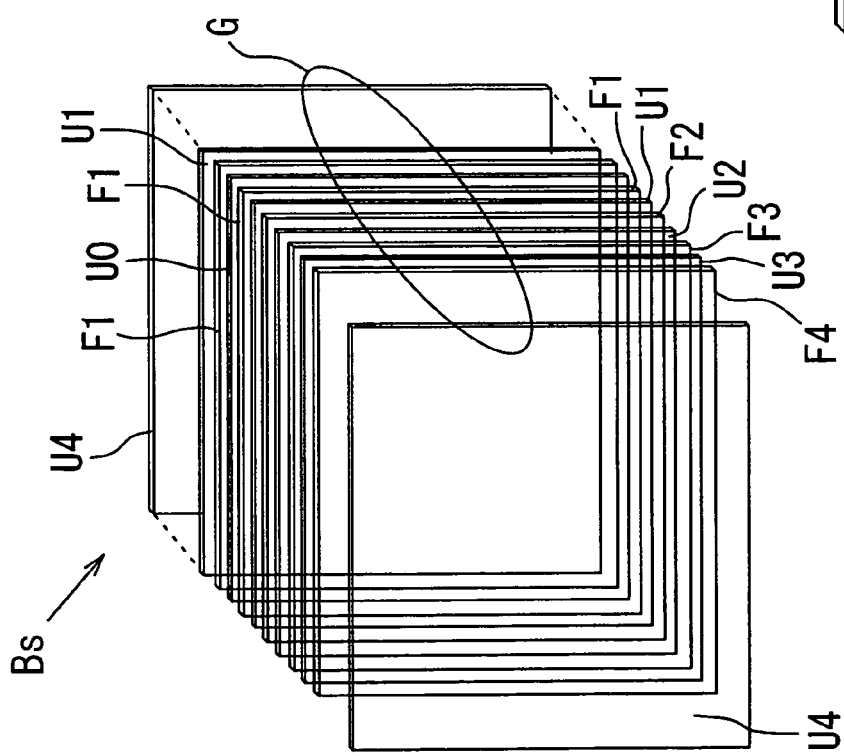
FIG. 5A is an explanatory exploded perspective view of a work-in-process of the light controlling means at one process.
Figure 6:
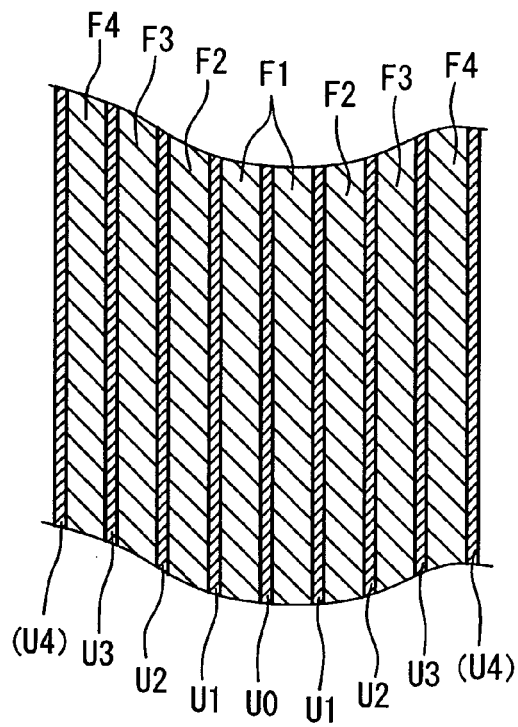
FIG. 6 is a schematic cross sectional view enlarged of a portion G of the work-in-process of FIG. 5A.

Referring first to FIG. 5A, plural (four in the figure) kinds of transparent resin films F1 to F4 are laminated over one another in this order so as to sandwich respective adhesive layers U1 to U3 formed of adhesive material capable of transmitting light emitted from the LED 1, thus forming a lamination unit, and two of lamination units thus formed are connected to each other such that respective resin films F1, F1 face each other via an adhesive layer U0 so as to make a mirror-image symmetric about the adhesive layer U0 as a center plate, whereby a block Bs covering several pieces of the light controlling means segments 4n is formed. More specifically, as shown in FIG. 6, two of the resin films F1, F1 having the lowest refractive index among the four kinds of resin films F1 to F4 are laminated over each other so as to sandwich the adhesive layer U0 which has a lower refractive index than the resin films F1, F1, then the adhesive layers U1, U1 having a higher refractive index than the resin films F1, F1 are laminated on respective resin films F1, F1, then the resin films F2, F2 having a higher refractive index than the adhesive layers U1, U1 are laminated on respective adhesive layers U1, U1, and then the adhesive layers U2, U2, the resin film F3, F3, the adhesive layer U3, U3, and the resin film F4, F4 are respectively laminated one after another in this sequence.

Then, a plural number (three in the figure) of blocks Bs each produced as described above are laminated on one another as shown in FIG. 5B, which produces a block Bm for yielding a plural number pieces of the light controlling means 4B.

The block Bm thus produced is divided into a plurality of pieces by cutting to dashed lines K parallel to one another and to dashed lines W parallel to one another and orthogonal to the dashed lines K, whereby a plural number pieces of the light controlling means 4B are produced, each of which is shown in FIG. 5C and has its light entrance and exit surfaces formed parallel to each other. In this connection, the distance between two adjacent lines K is dimensioned to be less than the length Ld of the dead area 2A of FIG. 9, ranging, for example, from 1 to 4 mm, and the cut sections do not have to be processed into a spherical surface but can be left plane as they are.

The transparent resin films F1 to F4 are formed of, for example, PET (polyethylene terephthalate), ZEONOA (trademark by Nippon Zeon Co., Ltd.), norbornene refractory transparent resin ARTON (trademark by JSR C., Ltd.), PMMA (polymethylmethacrylate), and the like. And, the adhesive layers U0 to U3 or U4 are formed of, for example, acrylic UV cured optical adhesive by Norland Corp. The resin films F1 to F4 and adhesive layers U0 to U3 or U4 formed of the aforementioned materials are selectively used as described later to meet the requirements. The transparent resin films F1 to F4 may be replaced by films formed of glass which has its cut surface optically polished easily thereby keeping down scattering loss at the cut surface, and which has an advantage in that the precise control of its composition enables a fine adjustment of a refractive index thereby readily achieving a refractive index distribution as desired. And, the numbers of the resin films and the adhesive layers are not limited to those mentioned in the embodiments but may alternatively be otherwise determined depending on the size of the light conductive plate 2, the number of the LED's 1, or the like.

Figure 4A:
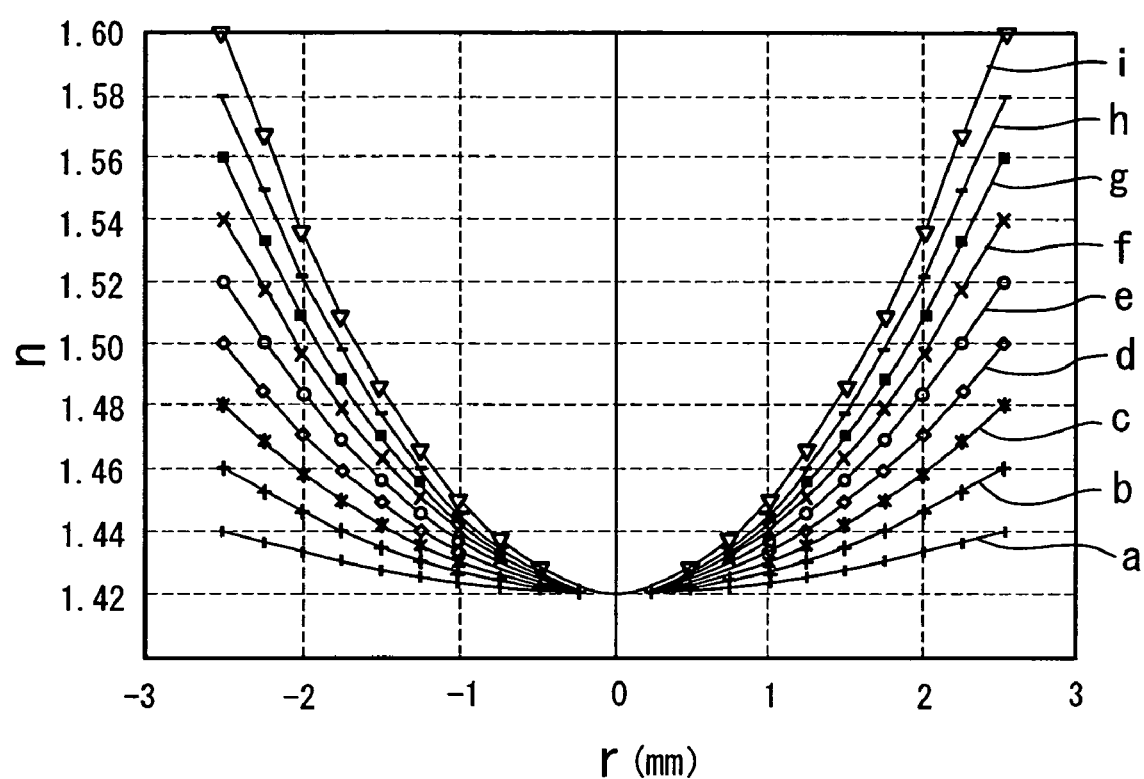
FIG. 4A is a graph of a refractive index profile of the light controlling means segment of FIG. 3A, and FIGS. 4B to 4E are views of light tracks achieved by different refractive index distribution constants $A^{1/2}$ set at the light controlling means segment.
Figure 4B:
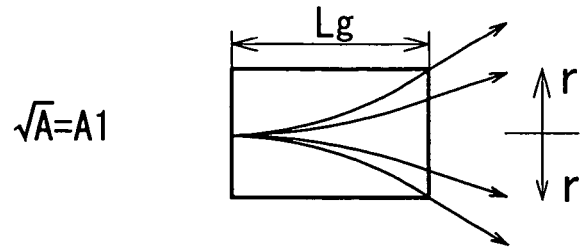
Figure 4C:
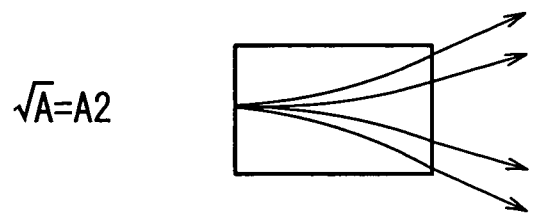
Figure 4D:
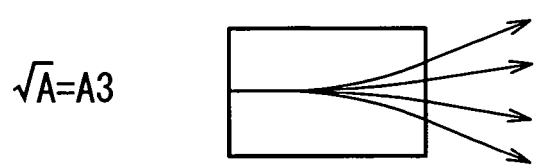
Figure 4E:
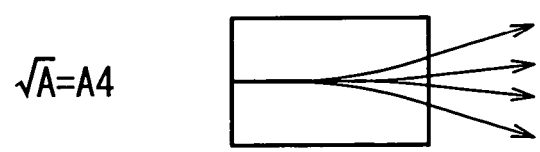

The resin films and adhesive layers of the light controlling means 4A in the first embodiment will now be further described with reference FIGS. 4A to 4E, and other drawings as appropriate. In FIG. 4A, the abscissa axis represents a distance r defined to measure from the center plane T of the segment 4n to a relevant point (relevant resin film or adhesive layer), the ordinate axi at the relevant point, and parameters indicated by a to i are refractive index distribution constants $A^{1/2}$ and set at 0.1, 0.2, 0.3, 0.4, 0.5, 0.6, 0.7, 0.8 and 0.9, respectively.

The number of the segments 4n is determined depending basically on a width Wp (refer to FIG. 1) of the light conductive plate 2, and further on the light distribution and intensity of the LED 1, a length Lp (refer to FIG. 1) of the light conductive plate 2, and the like. For example, in case of a typical portable telephone which is provided with a light conductive plate having a width of 30 mm and a length of 50 mm, three of the segments 4n are provided, and each of the segments 4n has a width Wn (refer to FIGS. 3A and 3B) of less than 10 mm. In the description to follow hereinlater, the width Wn of each segment 4n measures around 6 mm.

FIGS. 4B to 4E show light tracking views achieved by the constants $A^{1/2}$ defined by A1, A2, A3, and A4, respectively, where A1>A2>A3>A4, which indicates that light traveling through the segment 4n is diffused differently depending on refractive index distribution constants $A^{1/2}$. It is known from FIGS. 4B to 4E that light is diffused to a larger degree with a larger constant $A^{1/2}$. If the constant $A^{1/2}$ is set to be too large, then light is diffused too widely in the horizontal direction before it enters the light conductive plate 2 thus failing to enter the light conductive plate 2 effectively. On the other hand, if the constant $A^{1/2}$ is set to be too small, then light is not diffused widely enough and does not spread sufficiently within the light conductive plate 2 thus failing to provide a uniform illumination. The constant $A^{1/2}$ is appropriately set by determining refractive indexes and thicknesses of the resin films and the adhesive layers depending on the width Wp and length Lp of the light conductive plate 2 as follows.

Discussion will hereinafter be made on the process of determining refractive indexes n of the resin films F1 to F4 which are set at feasible values, for example, 1.42, 1.47, 1.54 and 1.60, respectively, and refractive indexes of the adhesive layers U0 to U3 which are feasibly set at, for example, 1.40, 1.45, 1.50 and 1.58, respectively.

As described above, for the purpose of achieving a smooth diffusing characteristic, it is required that the refractive index n of the inner most resin film F1 be set at a lowest value, and then the adhesive layers U1, U2 and U3, and the other resin films F2, F3 and F4, which are alternately laminated on one another, have their respective refractive indexes n gradually increasing in its lamination order. Based on the above requirement, respective refractive indexes n and also thicknesses t of the resin films F1 to F4 and adhesive layers U1 to U3, and U0 are determined considering that the aforementioned width Wn of the segment 4n measures around 6 mm. Here, the target is a refractive index distribution shown by i in FIG. 4A.

Since the four different resin films F1 to F4 are employed in one division of the mirror-imaged structure of the segment 4n, eight resin films in total are layered in the segment 4n. In order to achieve the width Wn of around 6 mm, an average thickness of each resin film is set at around 0.75 mm. First, refractive index and thickness of the innermost resin film F1 are set at 1.42 and 0.75 mm, respectively. Now, the next innermost resin film F2 is at least 0.75 mm away (=distance r) from the center plane T. Since it is known from FIG. 4A that the resin film F2 which is positioned at r=0.75 mm or more has to have a refractive index n of 1.43 or higher, the refractive index of the resin film F2 is set at, for example, 1.47 with its thickness set at 0.75 mm.

Thicknesses of the adhesive layers are appropriately determined according to the refractive indexes of the resin films set as described above. Specifically, the adhesive layer U0, which is sandwiched between two of the innermost resin films F1 so as to form a core layer of the segment 4n, is set to have a refractive index equal to or lower than the refractive index 1.42 of the resin film F1 (for example, set at 1.40). And, the adhesive layer U1, which is sandwiched between the resin films F1 and F2, is set to have its refractive index ranging between respective refractive indexes of the resin films F1 and F2, that is between 1.42 and 1.47 (for example, set at 1.45), and a thickness of the adhesive layer U1 is set at around 0.01 mm considering adhesive strength and mutual refractive indexes. In this way, refractive indexes and thicknesses of the remaining resin films F3 and F4 and adhesive layers U2 and U3 are appropriately set.

As apparent from FIG. 4A and also FIGS. 4A to 4E, a smaller constant $A^{1/2}$ means a decreased refractive index variation amount. If the length Lg of the segment 4n is allowed to be larger, then the refractive index distribution constant $A1^{1/2}$ can be set to be smaller, and preferably should be so done because a smaller refractive index variation amount can be achieved by a less number kind of resin films resulting in reduced cost. Also, a smaller constant $A^{1/2}$ means moderation of a refractive index graduation thereby achieving a smooth diffusion of light traveling through the segment 4n, which results in a favorable diffusing characteristic.

In case of the second embodiment employing the single piece light controlling means 4B structured such that a plurality of light controlling means segments 4n are continuously arrayed in direct contact with one another, refractive indexes and thicknesses of the resin films and adhesive layers can be set following the above-described process used for each of the segments 4n constituting the light controlling means 4A in the first embodiment, and details explanation is omitted.

Figure 7:
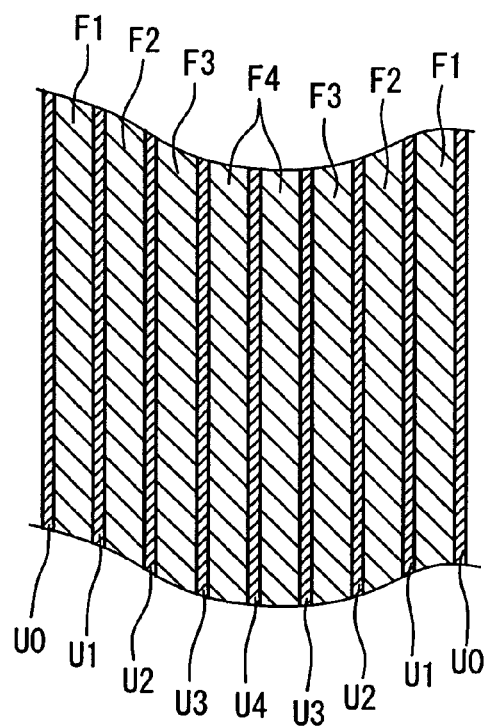
FIG. 7 is a schematic cross sectional view enlarged of a portion of a light controlling means employed in a spread illuminating apparatus according to a third embodiment of the present invention.

A third embodiment of the present invention will be described with reference to FIG. 7, and other drawings as appropriate. The third embodiment differs from the first or the second embodiment in that a plurality of light controlling means segments constituting a controlling means have a refractive index profile reversed. Specifically, each of the segments has its refractive indexes decreasing with an increase in distance from its center plane, and each of LED's has now its emitting center positioned at a portion of the segment constituted by an adhesive layer U4 having a highest refractive index. In this connection, if the segment consists of an odd number of resin films in total, then the adhesive layer U4 is removed and substituted by two resin films F4 combined into one film as a core layer, in which case the emitting center of the LED is positioned at the combined resin film F4. The segments may be spaced from one another as in the first embodiment or may alternatively be connected in contact with one another as in the second embodiment.

Figure 8B:
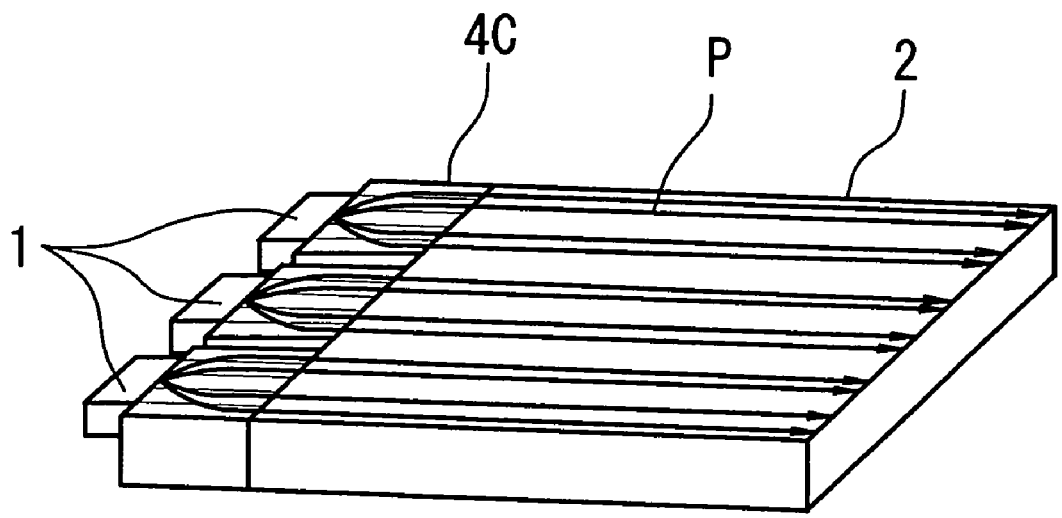
FIG. 8B is a light tracking view of the light controlling means employed in the third embodiment of the present invention.

Referring to FIG. 8B, in the third embodiment, light emitted from an LED 1 is at first diffused at a large angle, then has its diffusion angle decreasing as it progresses through a light controlling means 4C, and is finally collimated when entering a light conductive plate 2, which prevents unnecessary diffusion and therefore provides an excellent parallel ray characteristic within the light conductive plate 2 resulting in a uniform illumination with an increased brightness.

In the first to third embodiments, though not illustrated, a light controlling means for vertically diverging light emitted from the LED 1 may be disposed between the LED 1 and the light controlling means 4A (4B, 4C) which controls the light traveling direction horizontally, whereby the direction of light emitted from the LED is controlled at first vertically, and then horizontally, which results in a further efficient utilization of light emitted from the LED 1.

The refractive index profile of the light controlling means is not limited to monotone increase or decrease. Specifically, the refractive index may at first increase at the center area and then decrease at the outer area, whereby light emitted from the LED 1 is once diffused to some extent and then collimated. Also, the refractive index profile does not have to be structured symmetric about its center but may alternatively be asymmetrically structured depending on the requirements. Thus, the light controlling means according to the present invention can achieve a desired refractive index profile easily by appropriate selection and arrangement of resin films.

The preceding description has been presented only to illustrate and describe the invention, and it is not intended to be exhaustive or to limit the invention to any precise form disclosed. For example, the present invention is embodied by use of spot-like lamps (LED's) in order to explain efficient utilization of emitted light for bright and uniform illumination, but may be effectively applied to use of other type lams, such as bar-shaped fluorescent lamps, for achieving light distribution characteristics required.

Thus, it is apparent that various modifications, additions and other alternative embodiments are possible without departing from the true scope and spirit of the present invention, and it is intended that the scope of the present invention be defined by the following claims.

The invention claimed is:

1. A spread illuminating apparatus comprising:
   at least one light source;
   a light conductive plate that permits introduction of light emitted from the light source thereinto, and which allows the light introduced thereinto to exit out from a light exit surface thereof toward an object to be illuminated; and
   a light controlling means disposed between the at least one light source and the light conductive plate, the light controlling means having a refractive index profile formed in a direction parallel to the light exit surface of the light conductive plate.

2. A spread illuminating apparatus according to claim 1, wherein the light controlling means is structured such that a refractive index variation appears repeatedly in the direction parallel to the light exit surface of the light conductive plate.

3. A spread illuminating apparatus comprising:
   at least one light source;
   a light conductive plate that permits introduction of light emitted from the light source thereinto, and which allows the light introduced thereinto to exit out from a light exit surface thereof toward an object to be illuminated; and
   a light controlling means disposed between the at least one light source and the light conductive plate, the light controlling means having a refractive index profile formed in a direction parallel to the light exit surface of the light conductive plate, wherein a light entrance surface and a light exit surface of the light controlling means are planar.

4. A spread illuminating apparatus according to claim 3, wherein the light entrance surface and the light exit surface of the light controlling means are connected respectively to a light emitting surface of the light source and one end surface of the light conductive plate by means of adhesive which can transmit light emitted from the light source.

5. A spread illuminating apparatus according to claim 1, wherein the light controlling means comprises a plurality of transparent films laminated over one another, and two adjacent ones thereof are put together by adhesive which can transmit light emitted from the light source.

6. A spread illuminating apparatus according to claim 5, wherein the transparent films are formed of glass.

7. A spread illuminating apparatus according to claim 5, wherein the transparent films are formed of resin.

8. A spread illuminating apparatus according to claim 1, wherein the refractive index profile is formed symmetric about a plane corresponding to a center of the light source.

9. A spread illuminating apparatus according to claim 1, wherein the refractive index profile is formed asymmetric about a plane corresponding to a center of the light source.

10. A spread illuminating apparatus according to claim 2, wherein the light source is located to a portion of the light controlling means having a highest refractive index.

11. A spread illuminating apparatus according to claim 2, wherein the light source is located to a portion of the light controlling means having a lowest refractive index.

* * * * *

UNITED STATES PATENT AND TRADEMARK OFFICE
CERTIFICATE OF CORRECTION

| | | |
|---|---|---|
| PATENT NO. | : 7,066,634 B2 | Page 1 of 1 |
| APPLICATION NO. | : 10/788292 | |
| DATED | : June 27, 2006 | |
| INVENTOR(S) | : Atsushi Kitamura and Motoji Egawa | |

It is certified that error appears in the above-identified patent and that said Letters Patent is hereby corrected as shown below:

Title page,

In item [73], please change "Nalano-Ken" to --Nagano-ken--.

Signed and Sealed this

Twelfth Day of September, 2006

JON W. DUDAS
*Director of the United States Patent and Trademark Office*